United States Patent
Zhou et al.

(10) Patent No.: US 9,672,032 B2
(45) Date of Patent: Jun. 6, 2017

(54) MOBILE ENABLED APPLICATION

(71) Applicants: Yiquan Zhou, Singapore (SG); Ludo Franciscus Maria Noens, Singapore (SG); Qiushi Wang, Singapore (SG)

(72) Inventors: Yiquan Zhou, Singapore (SG); Ludo Franciscus Maria Noens, Singapore (SG); Qiushi Wang, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/613,384

(22) Filed: Feb. 4, 2015

(65) Prior Publication Data
US 2016/0224335 A1      Aug. 4, 2016

(51) Int. Cl.
*G06F 9/44*      (2006.01)
*G06F 9/445*     (2006.01)

(52) U.S. Cl.
CPC ............ *G06F 8/76* (2013.01); *G06F 9/44505* (2013.01); *G06F 9/44526* (2013.01)

(58) Field of Classification Search
None
See application file for complete search history.

(56) References Cited

U.S. PATENT DOCUMENTS

| | | | |
|---|---|---|---|
| 8,261,231 B1* | 9/2012 | Hirsch | G06F 8/20 709/201 |
| 8,533,336 B1* | 9/2013 | Scheffler | G06F 9/4445 709/226 |
| 8,788,935 B1* | 7/2014 | Hirsch | G06F 17/2247 715/234 |
| 8,997,038 B2* | 3/2015 | Bozek | H04L 67/10 717/106 |
| 9,170,800 B2* | 10/2015 | Lang | G06F 8/52 |
| 2006/0212864 A1* | 9/2006 | Calahan | G06F 9/44521 717/167 |
| 2013/0304799 A1* | 11/2013 | Lutter | G06F 17/30477 709/203 |
| 2014/0053126 A1* | 2/2014 | Watson | G06F 8/30 717/102 |
| 2014/0059513 A1* | 2/2014 | Sabo | G06F 8/70 717/101 |
| 2014/0136954 A1* | 5/2014 | Ligman | G06F 17/2247 715/234 |

(Continued)

OTHER PUBLICATIONS

Cordova Guide, Dec. 27, 2014, Evothings AB.*

*Primary Examiner* — Chat Do
*Assistant Examiner* — Douglas Slachta
(74) *Attorney, Agent, or Firm* — Horizon IP Pte. Ltd.

(57) ABSTRACT

A framework for enabling mobile functionality in a web application (App) to produce a mobile enabled App is described herein. In accordance with one aspect, a web App and a configuration file is provided to a mobile application (mApp) enabler. The configuration file contains configuration information for mobile enablement. The mApp enabler changes a project structure of the web App to a mobile structure and inserts bootstrap codes into the web App. The bootstrap codes load plugins for mobile devices. Codes to handle events available on mobile devices may be inserted, and data sources for the web App may be converted to data sources for a mobile enabled App to enable the web App for mobile (mobile enabled web App).

18 Claims, 8 Drawing Sheets

(56) References Cited

U.S. PATENT DOCUMENTS

| | | | |
|---|---|---|---|
| 2014/0281905 A1* | 9/2014 | Burckart | G06F 17/30893 |
| | | | 715/234 |
| 2015/0012908 A1* | 1/2015 | Farooqi | G06F 8/34 |
| | | | 717/107 |
| 2015/0317130 A1* | 11/2015 | Rempell | G06F 9/4443 |
| | | | 717/109 |
| 2015/0324189 A1* | 11/2015 | Udall | H04L 67/42 |
| | | | 717/173 |

* cited by examiner

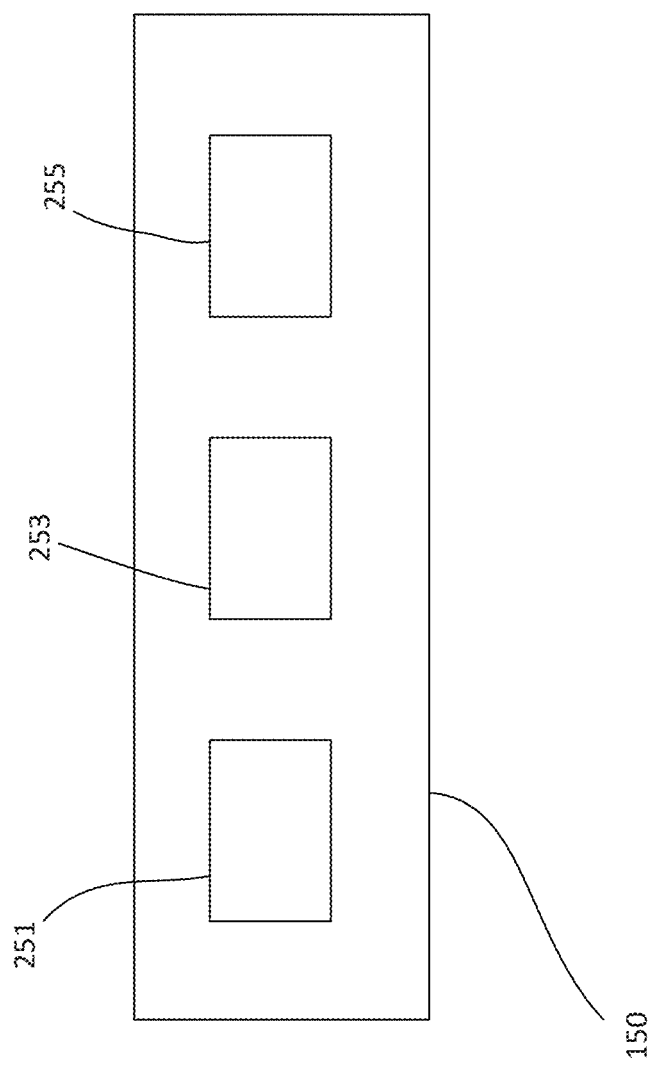

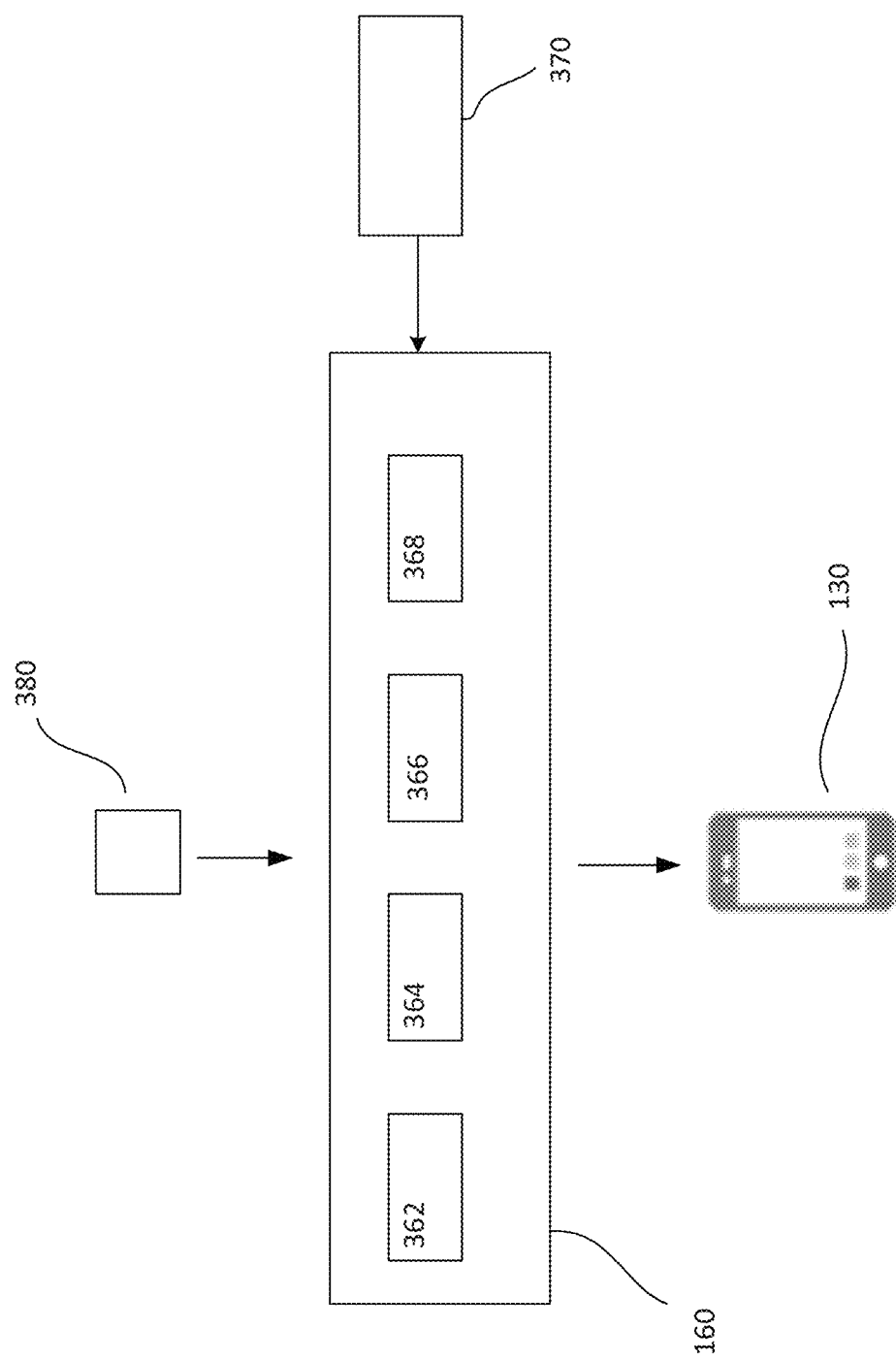

MOBILE ENABLED APPLICATION

TECHNICAL FIELD

The present disclosure relates generally to a framework for developing applications (Apps).

BACKGROUND

Apps are developed for a wide variety of purposes. One type of App is web-based App (web App), which, for example, includes web application code that resides on a server. The web App is accessed using a browser on an end-user device. An advantage of web-based Apps is that they can be maintained and updated without distributing and installing software on local devices as well as inherent support for cross-platform compatibility. To develop a web App, a web integrated development environment (IDE) may be employed.

Conventional web Apps generally cannot access local resources, unlike a native App. For example, the web browser prevents access by the web App to native APIs. In other words, web Apps are not mobile enabled.

The present disclosure relates to effectively and efficiently developing mobile enabled Apps from web Apps.

SUMMARY

A framework for enabling mobile functionality in a web application (App) to produce a mobile enabled App is described herein. In accordance with one aspect, a web App and a configuration file is provided to a mobile application (mApp) enabler. The configuration file contains configuration information for mobile enablement. The mApp enabler changes a project structure of the web App to a mobile structure and inserts bootstrap codes into the web App. The bootstrap codes load plugins for mobile devices. Codes to handle events available on mobile devices may be inserted, and data sources for the web App may be converted to data sources for a mobile enabled App to enable the web App for mobile (mobile enabled web App).

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 2 shows a simplified block diagram of an embodiment of an App development system;

FIG. 3a shows a simplified block diagram of an embodiment of a mobile application enabler;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
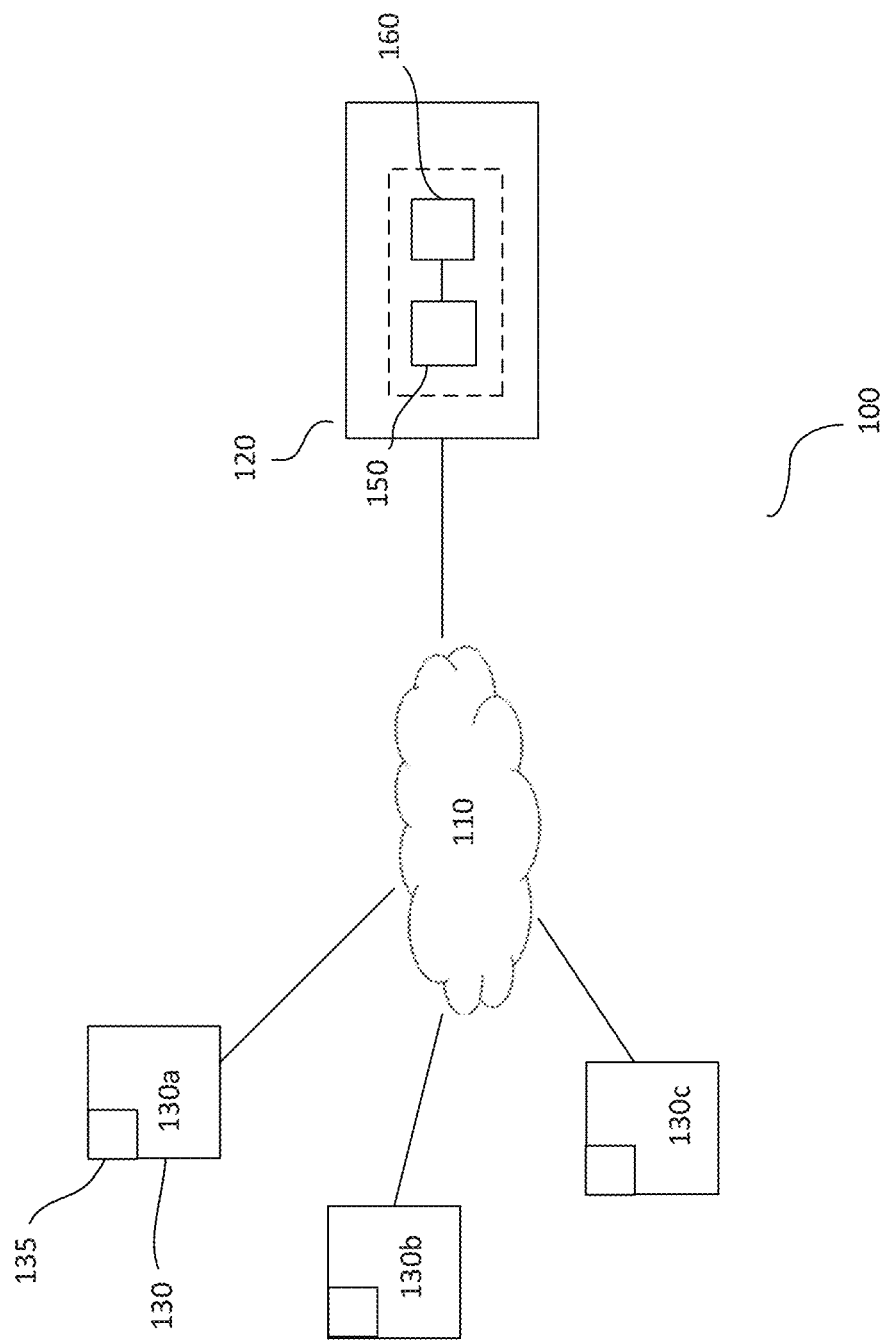
FIG. 1 shows a simplified diagram of an exemplary environment or architecture.

FIG. 1 shows a simplified diagram of an exemplary environment or architecture 100. Environment 100 may have a distributed architecture, such as a client-server architecture. The environment, in one implementation, includes a communication network 110. The communication network, for example, may be the World Wide Web (WWW or Web). Other types of communication networks or combination of networks may also be useful.

The environment includes a server 120. A server may be a computer with a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component.

The server 120, for example, may include a plurality of interconnected servers. For example, the servers are interconnected by a communication network. The communication network may be an internet, an intranet, a local area network (LAN), a wide area network (WAN) or a combination thereof. The servers may be located in a single or multiple locations. The interconnected servers may be collectively referred to as a server.

The server 120 is configured to store and process resources requested by client devices 130. A client device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as the client device. For example, the client device may be a PC, a tablet PC, a workstation, a network computer, or a mobile computing device, such as a laptop, a tab or a smart phone. Other types of processing devices may also be used.

The environment of the client device may be referred to as a local or native environment. A client or end-user and client device may be used interchangeably. For example, when referring to an end-user, it is understood that the end-user connects to the communication network using a client device. The client device may be referred to as the client side while the server may be referred to as the server side. It is understood that client devices need not be of the same type. For example, some client devices may be mobile devices running of different types of platforms, such as iOS or Android, while other devices may be desktop or laptop computers.

In one implementation, the local environment of the client device includes a user agent 135. The user agent, for example, may be a web browser. The browser facilitates communication with the server. For example, the browser initiates communication to a web server by making a request for a specific resource using, for example, a Hypertext Transfer Protocol (HTTP) and the server responds with the content of that resource. Communication with the server, for example, may be through internet connection. The internet connection may be using a mobile telecommunication network, such as a 4G network. Other types of connections to the server may also be useful. An end-user may access the server by, for example, having a user account.

In other implementations, the environment 100 may be a cloud computing environment. In such cases, the interconnected servers 120 form a cloud. The cloud, for example, hosts and processes resources, such as applications and data, as well as other resources. Different servers may be used to store or process different resources. Such hosting and processing may be considered as cloud services. Various types of cloud services may be provided. The cloud services may be provided in a public, private or hybrid network. The cloud services may be provided by a cloud service provider. For example, the cloud services may be SAP HANA Cloud Platform provided by SAP SE. Other types of clouds and cloud providers may also be useful. A client device 130 accesses resources on the cloud using, for example, a browser 135. Other configurations of the environment may also be useful.

The environment 100 includes an application (App) development system 150. The App development system 150 is a software tool for developing Apps. The development tool, for example, is used to develop web Apps. In one implementation, the development tool is an integrated development environment (IDE). The IDE may be a wizard-based IDE. For example, the IDE includes wizards to guide the developer in developing Apps. In one implementation, the IDE is a web-based or web IDE residing in the server 120. In some implementations, the IDE resides on the cloud. The web IDE is accessed by a web browser 135 on a client device 130. For example, a developer or end-user may log on to the cloud, accessing the IDE from the web browser of a client device. The IDE, for example, may be a SAP Web IDE from SAP SE. Other types or configurations of IDEs may also be useful. Apps under development may be stored in the server.

In one implementation, the server includes a mobile App (mApp) enabler 160. The mApp enabler enables a web App to run as a mobile App. For example, the mApp enabler transforms a web App to a hybrid App. As an example, a web App may be developed by the IDE and subsequently transformed or converted into a hybrid App. In one implementation, the mApp enabler is an integrated enabler. For example, the mApp enabler is part of the IDE, as indicated by the dotted line. The transformation may be achieved by selecting mobile enablement in the IDE. For example, a user selection box may be checked to select mobile enablement. Providing a non-integrated enabler may also be useful. For example, the enabler may be initiated and provided with the web App for conversion. Other configurations of the enabler may also be useful. FIG. 2 shows a simplified block diagram of an embodiment of an App development system 150. As shown, the App development system includes various modules for developing a web App. In one implementation, the App development system includes a UI module 251, resource module 253 and a code module 255. Providing different or additional modules may also be useful.

The UI module 251 may be a graphical UI (GUI) module. The UI module enables a user to navigate the IDE. For example, the UI may include a menu bar with commands or functions that a user can select. The commands and functions facilitate in the process of creating, testing and deploying the App. In one implementation, the UI may be based on SAP UI5. Other types of UIs may also be useful.

The resource module 253 includes resources for creating or developing a web App. For example, the resource module includes various templates for different types of Apps. For example, templates, such as Kapsel App templates, Fiori Templates, may be provided in the resource module. Providing templates for other types of Apps may also be useful. The resource module may include other types of resources for developing Apps. Such resources may include design resources, such as layout command resources. For example, mobile controls and mobile UI components may be included in the resource module.

The code module 255 facilitates coding for the App. For example, a user, such as a designer or developer of Apps, may employ the code module to generate codes for the App. In one implementation, the code module includes a code editor for manual coding as well as auto-coding capabilities, such as coders, for completing codes or adding code snippets. The generated codes may be modified using the code editor.

Other modules, such as a preview module and a deployment module (not shown) may also be provided. The preview module facilitates previewing an App that has been developed or is under development while the deployment module includes functions to facilitate deployment of the App. The App may be deployed to a mobile platform and mobile device as well as to a web server. The mobile platform, for example, may be a mobile server from SAP SE such as, SAP Mobile Platform (SMP) server, which manages the life cycle of mobile applications on the devices. For example, when the deployment command is selected, the deployment module configures the App, simplifies settings, builds the App and deploys it. Deployment functions, for example, may be included in an IDE. Providing other configurations of deployment functions may also be useful.

FIG. 3a shows a simplified block diagram of an embodiment of a mApp enabler 160. As shown, the mApp enabler includes various modules for transforming or converting a web App to a hybrid App. In one implementation, the mApp enabler includes a project structure processor module 362, a bootstrap generator module 364, an event handler generator module 366 and a data source converter module 368. Providing different or additional modules may also be useful.

As shown, the mApp enabler receives a web App 380 for conversion. The web App includes a project structure that contains all resources required to deploy it on a web server. The App, for example, is consumed via a web browser or similar client application.

Figure 3B:
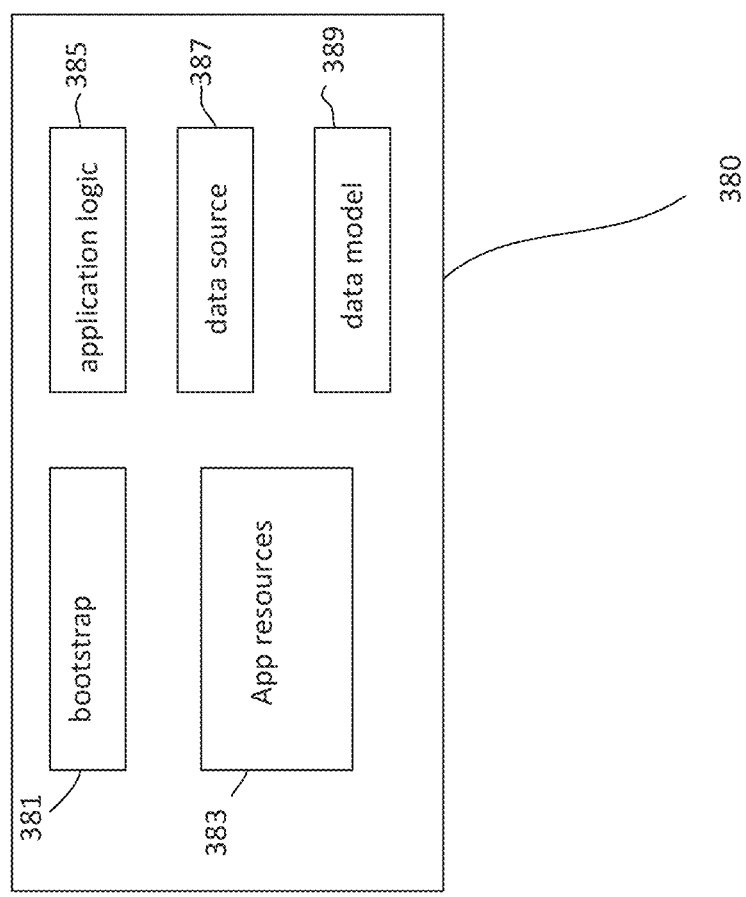
FIG. 3b shows a simplified block diagram of a web App.

FIG. 3b shows a simplified block diagram of a web App 380. The web App includes various modules. For example, the web App includes a bootstrap module 381, an application resource module 383, an application logic module 385, a data source module 387 and a data model module 389. Providing a web app with other modules may also be useful.

The bootstrap module includes bootstrap codes of the web App while the application resource module includes resources used by the web App. For example, resource module may include pages, widgets, controls, graphics and UI libraries, such as UI5 libraries. Other types of resources may also be included in the resource module. The application logic module includes the application logic as well as event handlers. As for the data source module, it includes data sources used by the web App while the data model module includes the data models for data sources.

Referring back to FIG. 3a, the mApp enabler interacts with a project configuration module 370. The project configuration module contains the project settings related to conversion project. This includes settings for the different enabler modules as well as preferences related to the conversion to the hybrid App. For example, project settings may include application information, such as which events are enabled or disabled or which channel events are reported to, platform supported by the hybrid App, mobile device plugins used by the hybrid App, and mobile platform server. Other settings information may also be included. For example, configuration information may include how open data protocol (OData) sources are translated or how bootstrap code is inserted.

The project structure processor module 362 changes the project's folder structure. The original project folder structure is changed from a web structure to a hybrid structure. The hybrid structure, for example, may be a Cordova structure. Other types of hybrid structures may also be useful. In one implementation, the original project folder structure is inserted into a Cordova project structure. References to resources in the original structure folder are inserted in the Cordova project structure. Additional files may also be added based on resources used. For example, additional files are added to provide correct bootstrap code to enable the App to run as a hybrid App. The bootstrap code, for example, sets up the runtime for running on a mobile device, including adding event processing and enabling access to native APIs.

The bootstrap generator module 364 inserts additional bootstrap code into the original bootstrap part of the source code of the App. For example, additional bootstrap code is inserted for loading Cordova and additional Cordova plugins when the App is started. Cordova, for example, is the base that creates a bridge between the web App and native code. The individual plugins provide APIs to specific functionality in serving as the bridge. Insertion of bootstrap code by the bootstrap generator may include dynamic insertion at runtime. Other insertion techniques may include use of code extension mechanism, which allows overloading of the original code. In other implementations, the additional bootstrap code may be automatically added to the source file. How bootstrap codes are inserted may be defined in the configuration file.

The event handler generator module 366 handles events that are available on mobile devices. For example, codes to handle events are inserted into the App. For example, events may include events created by Cordova, such as errors or device ready, indicating that the App has started and Cordova APIs are available for use. Other events may include device online or offline status, battery status, such as critical, low, or generic status information, as well as events related to buttons pressed, such as back, menu, search, volume up/down, start/end a call. Also, the event handler generator module 366 may handle events related to App state changes, such as pause or resume. Handling other types of events by the event handler generator module may also be useful.

The data source converter module 368 converts the data sources of the web App to data sources for hybrid App. The data sources or services may employ open data protocol (OData). In one implementation, OData sources of the web App are converted to OData sources for the hybrid App. For example, a web App is an online App hosted on a web server. An OData source is defined by a unique name and points to a source (e.g., URL) of an OData service exposed on a backend system via an OData endpoint. The sources of OData used by the web App are translated into URLs pointing to OData services exposed on one or more backend systems for the hybrid App. Configuration of the OData sources may be performed during deployment of the App. For example, the OData source is specified in the application code.

The App may be deployed to a mobile platform server. The mobile platform server, for example, may be a SAP Mobile Platform server. Other types of mobile platform servers may also be useful. The App may be deployed in the form of an application registration (unique identification number) and configuration. The App may be deployed to a mobile device in parallel, using the same identification number to access the mobile platform server. For example, the deployment of the App involves a server and a mobile (client) device. Other deployment configurations may also be useful.

In the case of a web App developed using SAP Web IDE, it may be deployed to HANA Cloud Platform (HCP). The destinations for OData sources may be defined on the HCP, which may act as a proxy. For example, the destinations may be configured on the HCP administration cockpit. The destinations may be used by the web App built with SAP Web IDE.

When the web App is converted into a hybrid App, the original destinations are converted to URLs pointing to OData services exposed on one or more backend systems used by the hybrid App. In the case of using SAP Mobile Hybrid SDK (Kapsel) for building hybrid applications, an additional proxy may be configured. For example, the proxy SAP Mobile Platform (SMP) is configured. In such case, the original destinations are converted or configured to URLs pointing to OData services defined on SMP. Configuration of the OData destinations may be performed during deployment of the App to SMP. In other cases, the hybrid App may access the OData source directly from the mobile device. For example, in the case the mobile App is deployed to the mobile device, the OData source may be accessed directly from the mobile device.

Figure 4:
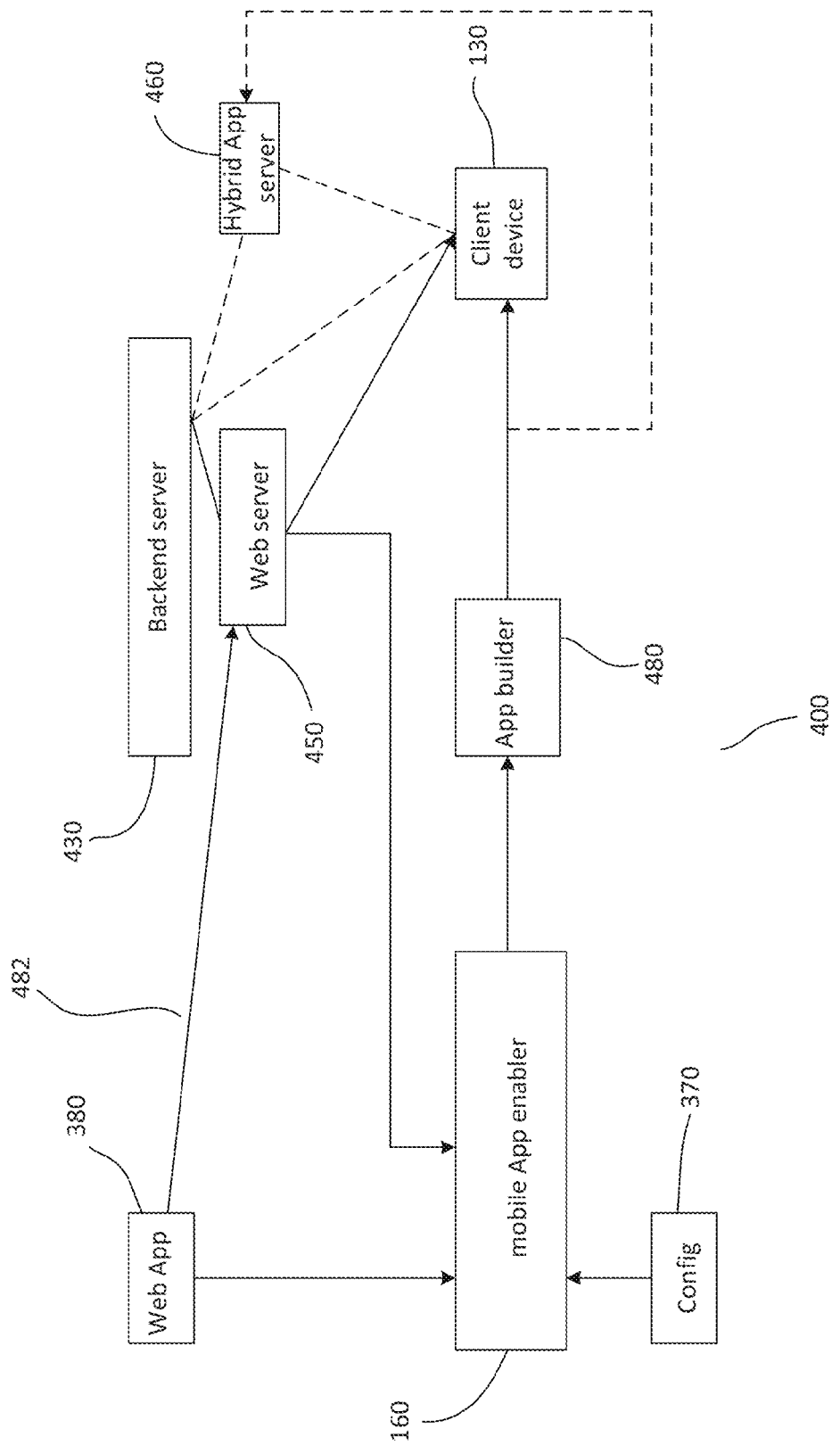
FIG. 4 graphically illustrates an implementation of a process.

FIG. 4 graphically illustrates an implementation of a process 400. As shown, a web App 380 is provided. The web App is developed by an IDE. In one implementation, the web App is developed by a SAP Web IDE. Developing the web App using other types of IDEs may also be useful. The web App is deployed to a web server 450. For example, the web server may be a Hana Cloud Platform (HCP) from SAP SE. Other types of web servers may also be useful. The web App includes sources of data services, such as OData sources. For example, the web App includes URLs of OData services exposed on one or more backend server 430 via OData endpoints. The web App may run on a browser on the client device 130, such as a mobile device.

The web App may be provided to a mobile App (mApp) enabler 160. The mApp enabler converts the web App to a hybrid App. The mApp enabler converts the web App to a hybrid App based on configuration settings in the project configuration module 370. The mApp enabler converts data sources for the web App to data sources for the hybrid App.

An App builder 480 builds the hybrid App for deployment. For example, the App builder packages the hybrid App for deployment. In one implementation, the hybrid App is deployed to a client device directly, such as a mobile device or via a hybrid App server, such as a hybrid App server 460, such as a SMP server. Other types of mobile platform servers may also be useful. The hybrid App server, for example, acts as a proxy. In such cases, the App is registered with the hybrid App server. For example, an end user may download the hybrid App from the mobile platform server to the client device.

Figure 5A:
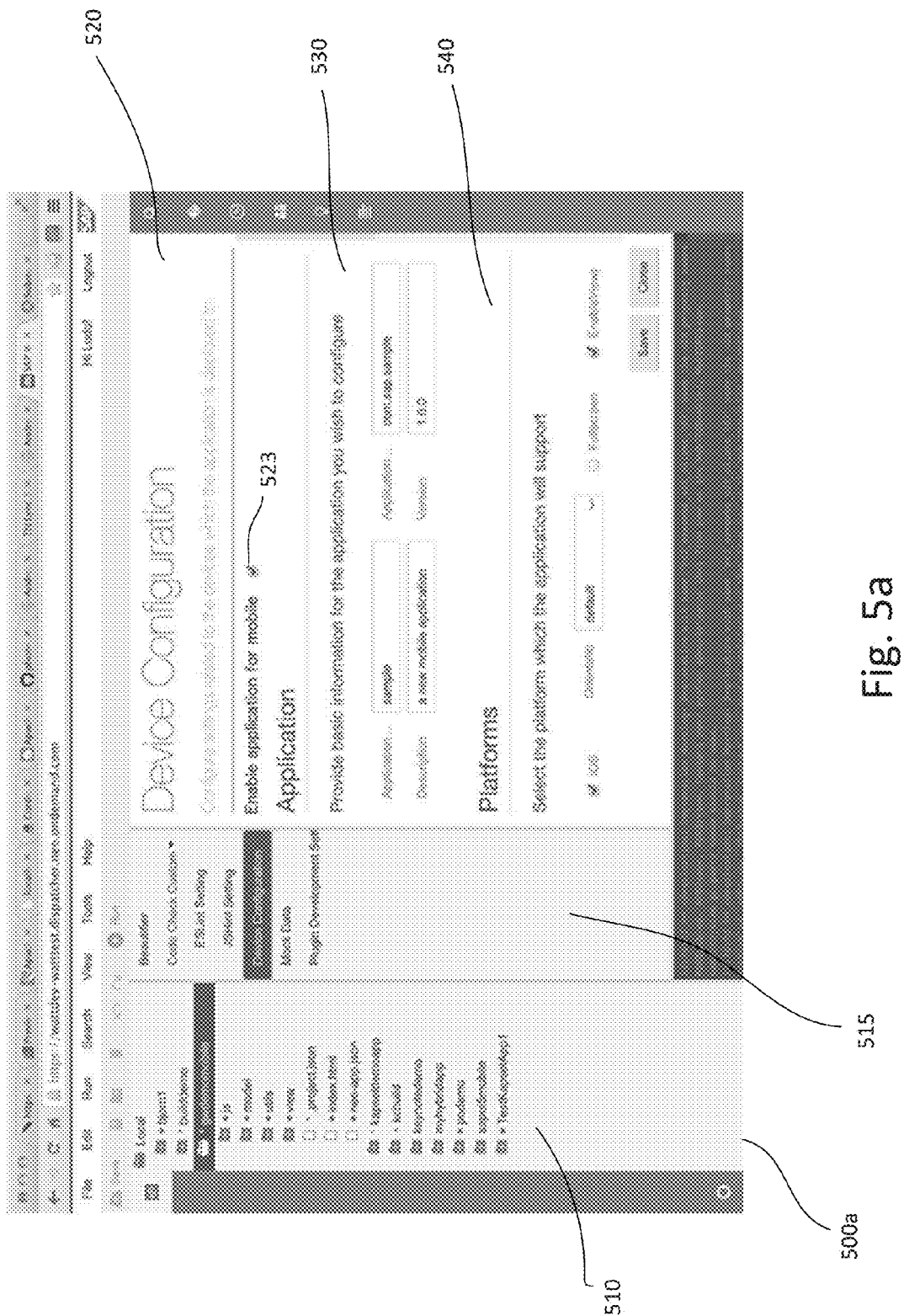
FIGS. 5a-c show exemplary screen shots of a UI of an IDE with a mobile App enabler.
Figure 5B:
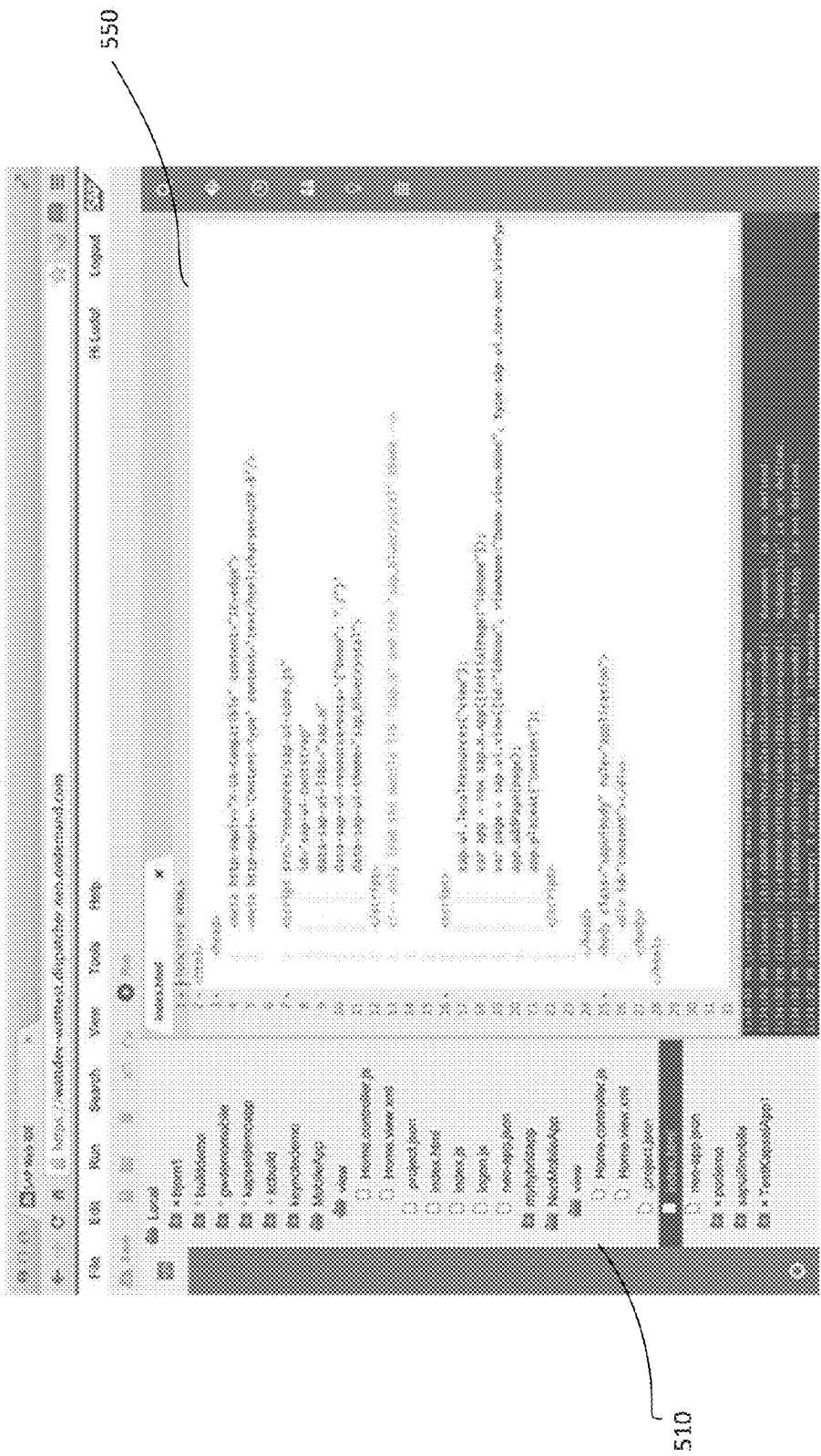
Figure 5C:
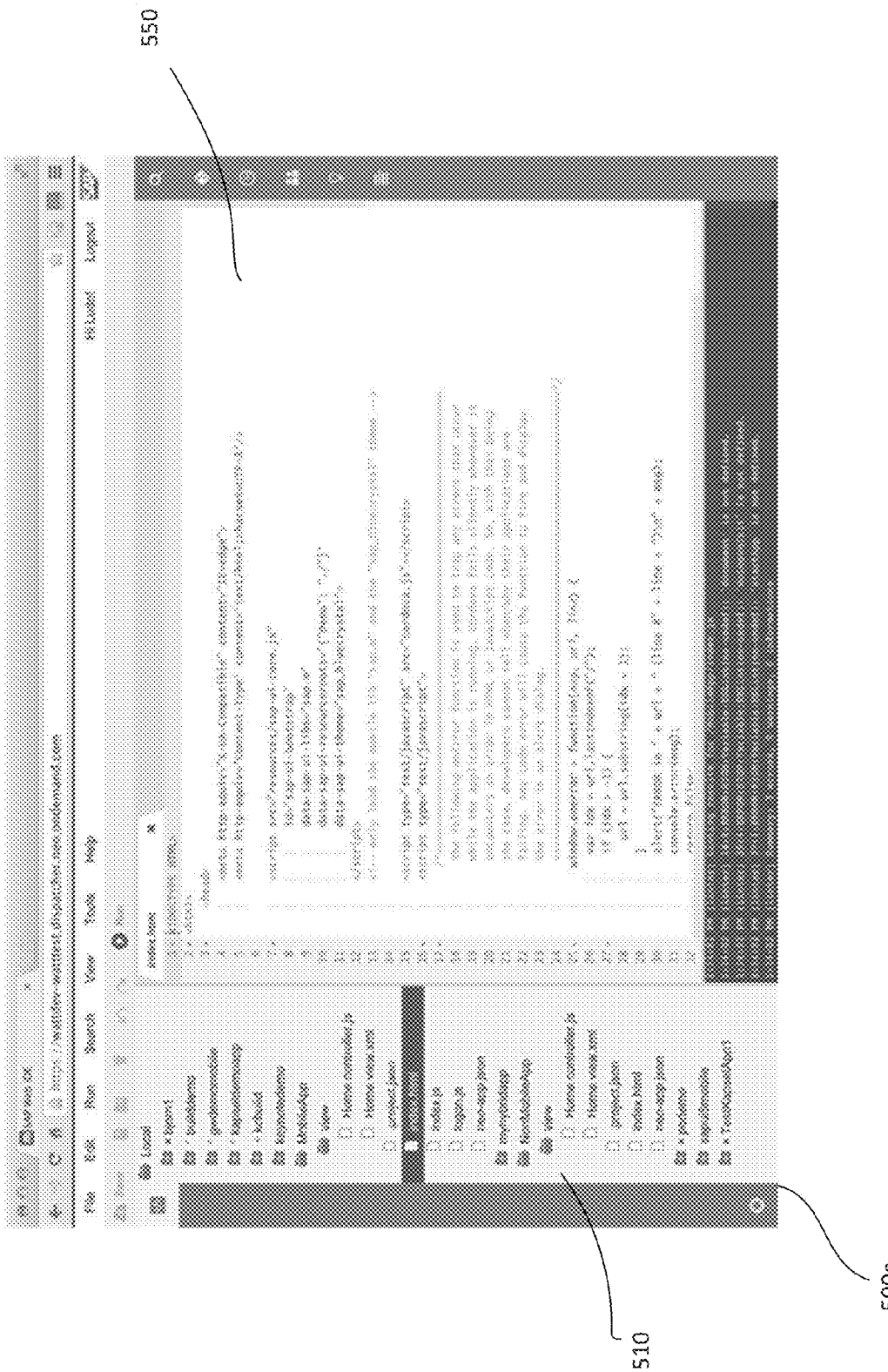

FIGS. 5a-c show various screen shots of a UI of an IDE with a mobile App enabler. The UI for example, is based on SAP UI5. Other types of UIs may also be useful. In one implementation, the UI is part of a SAP Web IDE. Other configurations may also be useful.

Referring to FIG. 5a, a screen shot of the configuration page 500a of the UI is shown. The UI includes a menu bar for navigating the IDE. In addition, the UI includes a workspace directory panel 510 that displays the directory structure of workspace which contains various projects. The workspace, for example, resides on the cloud. Projects, for example, are App projects. The UI includes a project settings panel or pane 515. For example, this pane contains settings or selections for a selected project. The project setting pane contains selections for the project, including device configuration settings. Selecting the device configuration setting displays a configuration panel 520. Other settings, such as, for example, code check, mock data and plugin development settings, may also be included.

The configuration panel includes various setting panels for the user to enter setting information. For example, the configuration panel includes a mobile enable selector 523. The mobile enable selector, for example, is a check box. When checked, the project or App is enabled for mobile operation. For example, the App is enabled for mobile using the mobile App enabler. The configuration panel includes an application panel 530 for entering application information of the App or project and a platform panel 540 for entering platform information of the App. For example, the platform may be the mobile platform, such as iOS, Android or other operating systems, on which the App is installed. Other setting panels, such as for plugins and mobile platform server may also be included. The mobile platform server indicates the server on which the App is deployed. The mobile platform acts as a proxy and is used for user and device management. The user may alternatively select direct deployment to a client device.

Referring to FIG. 5b, a screen shot of the UI 500b is shown. The screen shot includes the local directory panel 510 and a code panel 550 for a web App. For example, the code panel displays the project code for the web App. On the other hand, a screen shot of the UI 500c for a converted App (conversion from web to hybrid) is shown in FIG. 5c. The code panel 550 shows the loading of the Cordova bootstrap and error handler codes.

As described, the mobile App enabler may be embodied as an application. For example, the mobile App enabler may be embodied as a software application. The different components of the mobile App enabler may be integrated into an IDE or as a separate software application configured to operate or interact with each other, whether on the server or on an end-user device. The source code of the applications may be compiled to create an executable code. The codes, for example, may be stored in a storage medium, such as one or more storage disks or in memory of a server and/or end-user devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for enabling mobile functionality in a web application (App) to produce a mobile enabled App comprising:
providing a web App to a mobile application (mApp) enabler;
providing a configuration file to the mApp enabler, the configuration file contains configuration information for mobile enablement which includes codes to handle events, conversion of data sources, and insertion of bootstrap codes that loads a hybrid project structure and plugins of the hybrid project structure; and
converting the web App to the mobile enabled App by the mApp enabler, wherein the mApp enabler converts the web App to the mobile enabled App based on the configuration information in the configuration file by
changing a project structure of the web App to a mobile structure by inserting an original project folder structure of the web App into a hybrid project structure of the mobile enabled App, including references to resources in the original project folder structure,
inserting additional bootstrap codes into an original bootstrap part of the source code of the web App, wherein the additional bootstrap codes loads the hybrid project structure and plugins of the hybrid project structure when the mobile enabled App starts,
inserting codes to handle events available on mobile devices, and
converting open data protocol (OData) sources for the web App to open data protocol (OData) sources for the mobile enabled App to enable the web App for mobile (mobile enabled web App), wherein the OData sources used by the web App are translated into Uniform Resource Locators (URLs) pointing to OData services exposed on one or more backend systems for the hybrid App.

2. The method claim 1 wherein inserting the bootstrap codes comprises direct insertion of bootstrap codes.

3. The method claim 1 wherein inserting the bootstrap codes comprises dynamic insertion during runtime.

4. The method claim 1 wherein inserting the codes to handle events comprises direct insertion.

5. The method claim 1 wherein inserting the codes to handle events comprises using extensions.

6. The method of claim 1 wherein providing the web App comprises developing the web App using an integrated development environment (IDE).

7. The method of claim 6 wherein the mApp enabler is integrated with the IDE.

8. The method of claim 1 comprises deploying the mobile enabled web App.

9. The method of claim 8 wherein deploying comprises deploying the mobile enabled web App directly to a mobile device.

10. The method of claim 8 wherein deploying comprises deploying the mobile enabled web App to hybrid App server which acts as a proxy.

11. A mobile application (mApp) enabler system, comprising:
a non-transitory computer-readable media for storing computer-readable program code; and a processor in communication with the computer-readable media, the processor being operative with the computer-readable program code to perform operations including receiving a web App, receiving a configuration file which contains configuration information for mobile enablement of the web App, wherein the configuration information includes codes to handle events, conversion of data sources, and insertion of bootstrap codes that loads a hybrid project structure and plugins of the hybrid project structure, changing a project structure of the web App to a mobile structure by inserting an original project folder structure of the web App into a hybrid project structure of a mobile enabled App, including references to resources in the original project folder structure, inserting additional bootstrap codes into an original bootstrap part of the source code of the web App based on the configuration information in the configuration file, wherein the additional bootstrap codes loads the hybrid project structure and plugins of the hybrid project structure when the mobile enabled App starts, inserting codes to handle events available on mobile devices, and converting open data protocol (OData) sources for the web App to open data protocol (OData) sources for the mobile enabled App, wherein the OData sources used by the web App are translated into Uniform Resource Locators (URLs) pointing to OData services exposed on one or more backend systems for the hybrid App.

12. The mApp enabler system of claim 11 is integrated into an integrated development environment (IDE) used in developing the web App.

13. The mApp enabler system of claim 11 wherein:
the codes to handle events are inserted based on the configuration file; and
the data sources are converted based on the configuration file.

14. The mApp enabler system of claim 11 wherein the bootstrap codes are inserted directly into the web App.

15. A non-transitory computer usable medium having a computer readable program code tangibly embodied therein, the computer readable program code adapted to be executed by a processor to implement a method for mobile enablement of an application (App) comprising:

receiving a web App by a mobile application (mApp) enabler;

receiving a configuration file by the mApp enabler, the configuration file contains configuration information for mobile enablement;

changing a project structure of the web App to a mobile structure by inserting an original project folder structure of the web App into a hybrid project structure of a mobile enabled App, including references to resources in the original project folder structure;

inserting additional bootstrap codes into an original bootstrap part of the source code of the web App, wherein the additional bootstrap codes loads the hybrid project structure and plugins of the hybrid project structure when the mobile enabled App starts;

inserting codes to handle events available on mobile devices; and converting open data protocol (OData) sources for the web App to open data protocol (OData) sources for the mobile enabled App to enable the web App for mobile (mobile enabled web App), wherein the OData sources used by the web App are translated into Uniform Resource Locators (URLs) pointing to OData services exposed on one or more backend systems for the hybrid App.

16. The computer usable medium of claim 15 wherein inserting bootstrap codes, inserting codes to handle events and converting data sources is based on the configuration file.

17. The computer usable medium of claim 15 wherein the mApp enabler is integrated into an integrated development environment used to develop the web App.

18. The computer usable medium of claim 15 comprises deploying the mobile enabled web App.

* * * * *